(12) United States Patent
Asai

(10) Patent No.: US 7,866,823 B2
(45) Date of Patent: Jan. 11, 2011

(54) IMAGE PROJECTION APPARATUS

(75) Inventor: Hiromi Asai, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 676 days.

(21) Appl. No.: 11/738,801

(22) Filed: Apr. 23, 2007

(65) Prior Publication Data
US 2007/0252955 A1 Nov. 1, 2007

(30) Foreign Application Priority Data
Apr. 27, 2006 (JP) .............................. 2006-124278

(51) Int. Cl.
G02B 7/02 (2006.01)
(52) U.S. Cl. ........................ 353/52; 353/101; 359/820
(58) Field of Classification Search .................. 353/52, 353/53, 101; 359/820
See application file for complete search history.

(56) References Cited

U.S. PATENT DOCUMENTS

| 5,105,075 | A | * | 4/1992 | Ohta et al. | ................ | 250/201.2 |
| 5,130,839 | A | * | 7/1992 | Tomita | ..................... | 359/205.1 |
| 5,537,168 | A | * | 7/1996 | Kitagishi et al. | ............ | 353/101 |
| 5,600,496 | A | * | 2/1997 | Mori | .......................... | 359/820 |
| 5,936,717 | A | * | 8/1999 | Viola | ......................... | 356/72 |
| 6,137,640 | A | * | 10/2000 | Viola | ......................... | 359/820 |
| 6,472,828 | B1 | * | 10/2002 | Pruett et al. | ................. | 315/225 |
| 6,846,086 | B2 | * | 1/2005 | Goldstein | ................... | 359/846 |
| 6,886,942 | B2 | * | 5/2005 | Okada et al. | ................... | 353/52 |
| 7,278,745 | B2 | * | 10/2007 | Engle | ........................... | 353/69 |
| 7,602,563 | B2 | * | 10/2009 | Bloch et al. | ................. | 359/820 |
| 2007/0182940 | A1 | * | 8/2007 | Asai | ........................... | 353/101 |
| 2007/0252955 | A1 | * | 11/2007 | Asai | ............................ | 353/69 |
| 2009/0040471 | A1 | * | 2/2009 | Noda et al. | .................... | 353/61 |

FOREIGN PATENT DOCUMENTS

| CN | 1608229 A | 4/2005 |
| JP | 2000-244847 | 9/2000 |
| JP | 2003-161869 A | 6/2003 |
| JP | 2004-264570 | 9/2004 |
| WO | 03/058341 A1 | 7/2003 |

OTHER PUBLICATIONS

Chinese Office Action dated Apr. 10, 2009, issued in corresponding Chinese Application No. 200710102311.9.

* cited by examiner

Primary Examiner—John R Lee
(74) Attorney, Agent, or Firm—Rossi, Kimms & McDowell LLP

(57) ABSTRACT

An image projection apparatus is disclosed which is capable of correcting defocusing due to changes of the temperature of a projection lens, which are caused by various factors. The image projection apparatus includes an image-forming element which is illuminated with light from a light source, a projection lens which includes a focus lens and projects light from the image-forming element onto a projection surface, plural temperature detectors which are provided at positions different from each other in the image projection apparatus. The apparatus further includes a controller which controls the position of the focus lens on the basis of the detection results by the plural temperature detectors.

8 Claims, 4 Drawing Sheets

|  | ZOOM AREA1 | ZOOM AREA2 | ZOOM AREA3 | ZOOM AREA4 | ZOOM AREA5 |
|---|---|---|---|---|---|
| $T1 < T11$ | $\alpha 11$ | $\alpha 12$ | $\alpha 13$ | $\alpha 14$ | $\alpha 15$ |
| $T1 < T12$ | $\alpha 21$ | $\alpha 22$ | $\alpha 23$ | $\alpha 24$ | $\alpha 25$ |
| $T1 \geq T12$ | $\alpha 31$ | $\alpha 32$ | $\alpha 33$ | $\alpha 34$ | $\alpha 35$ |

TEMP. COEFFICIENT TABLE 1

FIG. 3

|  | ZOOM AREA1 | ZOOM AREA2 | ZOOM AREA3 | ZOOM AREA4 | ZOOM AREA5 |
|---|---|---|---|---|---|
| $T1 < T11$ | $\beta 11$ | $\beta 12$ | $\beta 13$ | $\beta 14$ | $\beta 15$ |
| $T1 < T12$ | $\beta 21$ | $\beta 22$ | $\beta 23$ | $\beta 24$ | $\beta 25$ |
| $T1 \geq T12$ | $\beta 31$ | $\beta 32$ | $\beta 33$ | $\beta 34$ | $\beta 35$ |

TEMP. COEFFICIENT TABLE 2

FIG. 4

IMAGE PROJECTION APPARATUS

BACKGROUND OF THE INVENTION

The present invention relates to an image projection apparatus such as a projector, and specifically an image projection apparatus having a focus correcting function for its projection lens.

Some of image projection apparatuses such as liquid crystal projectors have an autofocus function of automatically adjusting the focus of images projected onto a screen.

In the projector, however, the projection lens expands and shrinks by the influence of temperature variations caused by light from a light source. Therefore, defocusing due to temperature (hereinafter referred to as "temperature defocusing") is often caused even though the autofocus is performed.

In particular, immediately after power-on and immediately after switching of the projection mode (hereinafter referred to merely as "switching of the projected image"), the change of brightness of the projection image, that is, the change of the amount of projection light is large, so that the amounts of heat and light emitted from the light source and the amount of light entering the projection lens through a liquid crystal display element are widely changed. This rapidly changes the temperature in the projector and that of the optical system, thereby increasing the amount of the temperature defocusing.

In addition, a change of the environmental (ambient) temperature around the projector causes expansion and shrinkage of the projection lens, so that the temperature defocusing is caused.

Japanese Patent Laid-Open No. 2000-244847 has disclosed a technique to address these problems in which a temperature sensor is provided at the vicinity of the projection lens (focus lens) and the temperature defocusing is automatically corrected on the basis of the changes of the output from the temperature sensor.

Furthermore, Japanese Patent Laid-Open No. 2004-264570 has disclosed a technique in which the projection lens is forcibly heated in a state in which an exhaust outlet for cooling air provided on the chassis of the projector is closed to bring the projection lens into a heat-stable state. This prevents the temperature defocusing from being easily caused.

In the technique disclosed in Japanese Patent Laid-Open No. 2000-244847, however, since only one temperature sensor is provided at the vicinity of the projection lens, the response of the temperature sensor to the changes of the temperature of the projection lens itself due to the switching of the projected image is slow. Therefore, the temperature defocusing due to the switching of the projected image cannot be sufficiently corrected.

On the other hand, the technique disclosed in Japanese Patent Laid-Open No. 2004-264570 can rapidly bring the projection lens into a state in which the temperature defocusing is hardly caused by shortening the time until the projection lens is brought into a heat-stable state after power-on. However, this technique alone cannot prevent the temperature defocusing due to changes of the environmental temperature and the switching of the projected image.

BRIEF SUMMARY OF THE INVENTION

The present invention provides an image projection apparatus capable of correcting defocusing due to changes of the temperature of the projection lens, which are caused by various factors, and an image display system including the same.

The present invention provides, as one aspect thereof, an image projection apparatus which includes an image-forming element which is illuminated with light from a light source, a projection lens which includes a focus lens and projects light from the image-forming element onto a projection surface, plural temperature detectors which are provided at positions different from each other in the image projection apparatus, and a controller which controls the position of the focus lens on the basis of the detection results by the plural temperature detectors.

The present invention provides, as another aspect thereof, an image display system which includes the above-described image projection apparatus, and an image supply apparatus which supplies image information to the image projection apparatus.

Other objects and features of the present invention will become apparent from the following description and the attached drawings.

BRIEF DESCRIPTION OF THE DRAWINGS

FIG. 3 shows Temperature Coefficient Table 1 in the embodiment.

FIG. 4 shows Temperature Coefficient Table 2 in the embodiment.

DETAILED DESCRIPTION OF THE PREFERRED EMBODIMENTS

Preferred embodiments of the present invention will hereinafter be described with reference to the drawings.

Figure 1:
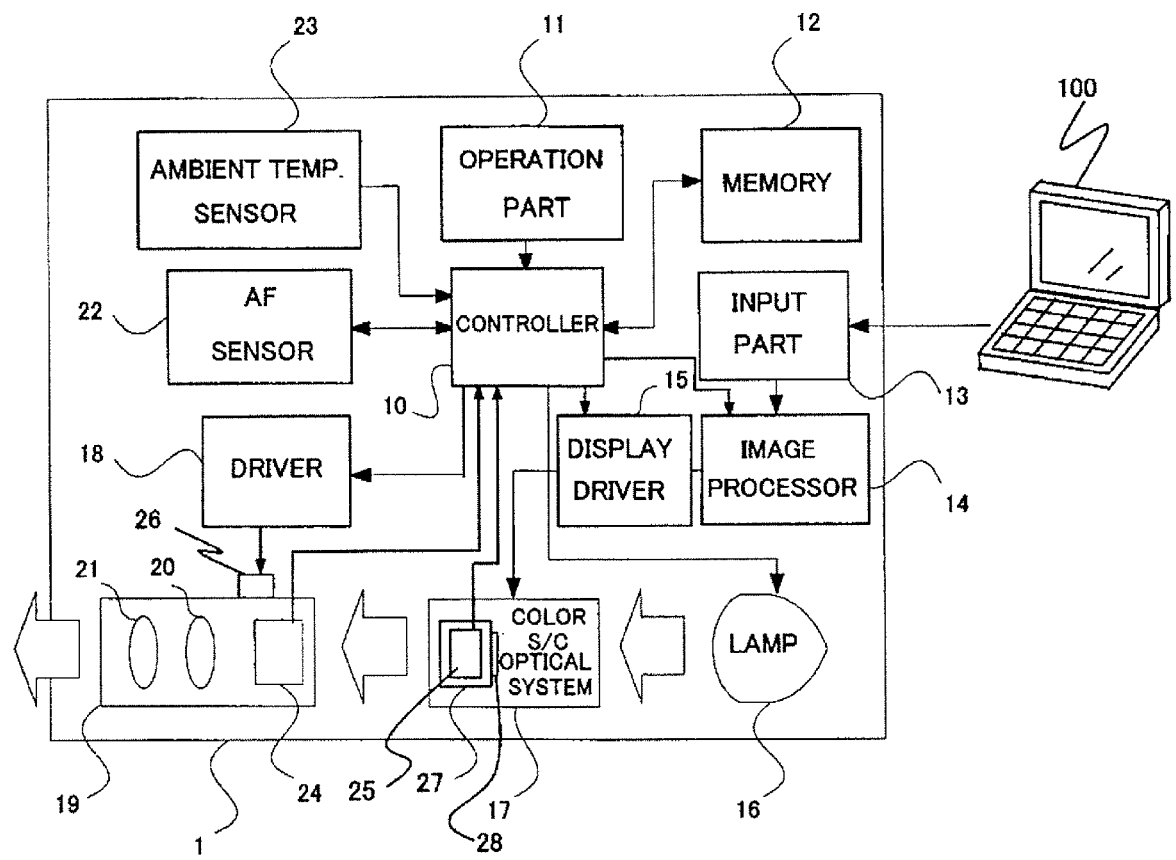
FIG. 1 is a block diagram showing a projector that is an embodiment of the present invention.

FIG. 1 shows the configuration of a liquid crystal projector (image projection apparatus) that is an embodiment of the present invention.

In FIG. 1, reference numeral 1 denotes a main body (chassis) of the projector. An operation part 11 includes a power on/off switch for turning on (applying) and off (shutting down) power, an AF switch for activating autofocus (AF), a mode switch for selecting projection modes, and the like.

A memory 12 stores temperature coefficient tables used in the correction of the temperature defocusing which will be later described, various data including operation parameters according to the projection modes, and the like. The memory 12 also stores computer programs for causing the controller 10 which will be later described to perform processing operations.

Reference numeral 13 denotes an input part into which a video signal (image information) is input from an image supply apparatus 100 such as a personal computer, a DVD player, and a television tuner. The liquid crystal projector and the image supply apparatus 100 constitute an image display system.

An image processor 14 performs sync separation processing on the video signal input from the input part 13 to generate R, G, and B video signals. The image processor 14 also performs digital processing such as tone correction for the video signals.

A display driver 15 generates driving signals according to the R, G, and B video signals which were subjected to the tone correction, and causes liquid crystal panels 28 which are image-forming elements for R, G, and B and placed in a color separation/combination optical system 17 to form images.

Although only one liquid crystal panel 28 is shown in the figure, three liquid crystal panels for R, G, and B colors are provided in actual projectors.

The color separation/combination optical system 17 color-separates illumination light from a light source lamp 16 to introduce the separated light components to the R, G, and B liquid crystal panels 28. The color separation/combination optical system 17 combines R, G, and B image light components to introduce the combined light to a projection lens 19.

The color separation/combination optical system 17 includes the above-described liquid crystal panels 28, a dichroic mirror (not shown), a prism element (optical member) 27 such as a dichroic prism and a polarization beam splitter, and an optical element (not shown) such as a polarizing plate and a phase plate.

The projection lens 19 includes a variator lens 20 and a focus lens 21 and projects the combined image light entering from the color separation/combination optical system 17 onto a projection surface such as a screen.

The variator lens 20 and the focus lens 21 are driven by actuators 26 via a driver 18 to be moved in a direction of the optical axis. The drive of the variator lens 20 varies the magnification of the projection lens 19.

Furthermore, the drive of the focus lens 21 or another lens (not shown) in conjunction with the drive of the variator lens 20 compensates fluctuations of the image plane which is associated with variation of magnification. In other words, the projection lens 19 is a zoom lens capable of varying its focal length.

The controller 10 controls operations of the light source lamp 16, the image processor 14, the display driver 15, and the driver 18 in accordance with signals from the operation part 11.

The controller 10 measures the distance (that is, AF information) from the projector to the projection surface such as a screen by the phase difference detection method or the trigonometric distance measuring method, which uses photoelectric conversion signals taken from an AF sensor (AF detector) 22.

To perform the distance measurement accurately, the projector projects a distance-measuring image which includes a certain pattern different from a normal image onto the projection surface.

The controller 10 calculates a focus position to project an image in focus at the measured distance and sends focus position information to the driver 18. The driver 18 drives the focus lens 21 in the projection lens 19 on the basis of the focus position information. AF control is thus performed.

The controller 10 takes defocusing of the projection lens 19 caused by temperature (temperature defocusing) into consideration in the AF control. Specifically, the controller 10 adds a correction amount for correcting the temperature defocusing to the focus position calculated from the measured distance information obtained by the AF sensor 22 to obtain a corrected focus position, and moves the focus lens 21 to the corrected focus position. A detailed method to obtain the corrected focus position will be described later.

The AF sensor 22 has a pair of lenses and a pair of light-receiving elements (line sensors), which are distanced by a predetermined base length for performing the above-described distance measurement.

However, the AF control method is not limited to the above-described one. A method may be used in which an AF sensor (two-dimensional imaging sensor) takes a patterned image projected onto the projection surface with movement of the focus lens 21 and stops the focus lens 21 at a position where edges of the taken image (AF information) are sharpest.

Temperature sensors 23, 24, and 25, which are temperature detectors, are installed at positions different from each other in the chassis 1. Each temperature sensor detects the temperature at its installation position and in a region adjacent thereto. All these temperature sensors 23, 24, and 25 are used for correcting the temperature defocusing of the projection lens 19.

Figure 5:
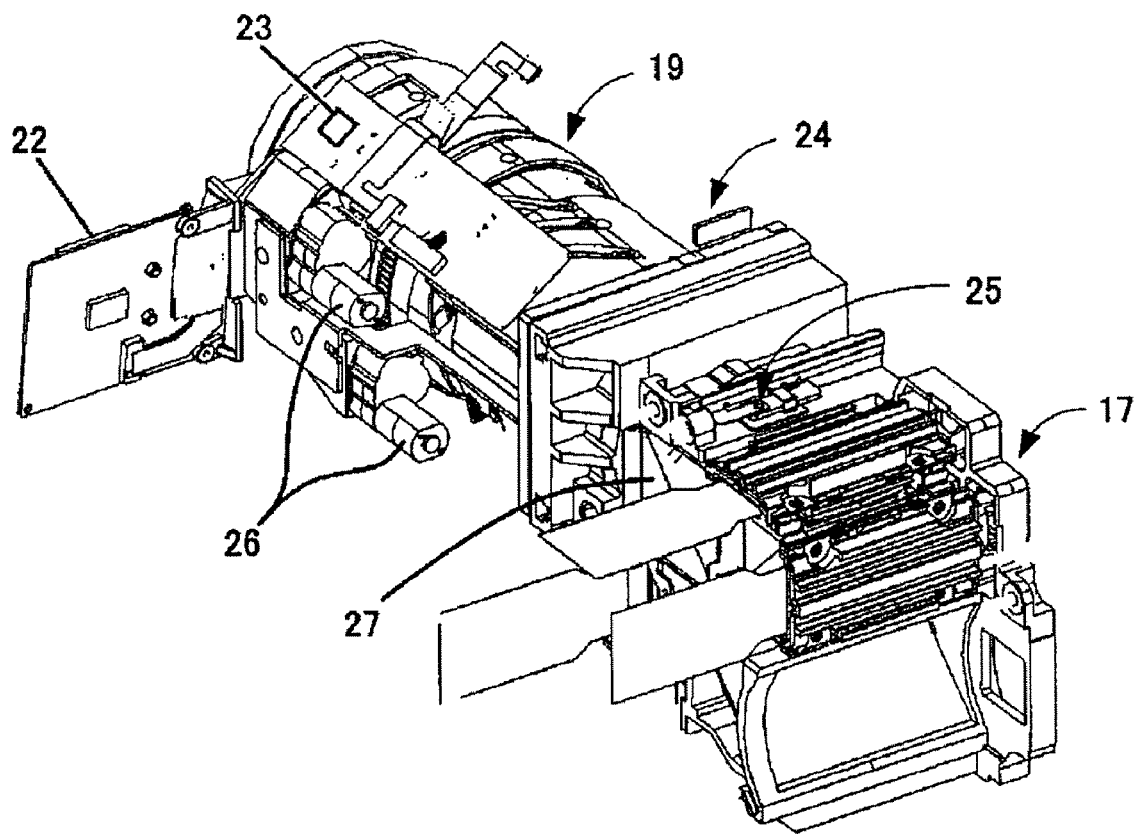
FIG. 5 is an oblique perspective view showing installation positions of temperature sensors in the projector of the embodiment.

FIG. 5 shows the installation positions of the respective temperature sensors (temperature detectors) 23, 24, and 25. In FIG. 5, the same constituents as those shown in FIG. 1 are given the same reference numerals.

The sensor 23 as an ambient temperature sensor is installed at the front end portion (projection surface side end portion) of the projection lens 19 and detects a so-called environmental temperature such as the temperature in a room where the projector of the present embodiment is used. Since the temperature defocusing occurring in the projection lens 19 changes also due to the environmental temperature, the use of the output value from the ambient temperature sensor 23 together with those from the other temperature sensors 24 and 25 makes it possible to correct the temperature defocusing more accurately.

In addition, the ambient temperature sensor 23 is installed near the AF sensor 22. Therefore, the temperature detected by the ambient temperature sensor 23 can be used for temperature correction of the result of distance measurement by the AF sensor 22.

The sensor 24 as a projection lens temperature sensor is installed at the outer circumference of the rear end portion (color separation/combination optical system side portion) of the projection lens 19 and detects the temperature of the projection lens 19 and in a region adjacent thereto. The ambient temperature sensor 23 is also installed near the projection lens 19 in this embodiment, but the installation position thereof is nearer the outer face of the chassis 1, in which a cooling air inlet is provided, than that of the projection lens temperature sensor 24, so that the ambient temperature sensor 23 is suitable for detecting the environmental temperature.

The sensor 25 as a prism temperature sensor is installed at a position adjacent to the prism element 27 constituting part of the color separation/combination optical system 17. In a case where the color separation/combination optical system 17 includes plural prism elements, it is preferable to install the prism temperature sensor 25 at a position adjacent to a prism element which introduces the image light from the liquid crystal panels 28 to the projection lens 19. This installation makes it possible to detect the temperature of the prism element 27, the temperature changing in association with the brightness of the projected image which is switched according to the projection modes or the like. When a bright image is projected, the amount of projection light is larger than when a dark image is projected, so that the temperature of the prism element 27 increases.

Note that the projection lens temperature sensor 24 can detect the temperature of the projection lens 19. However, the projection lens temperature sensor 24 is installed outside the projection lens 19, so that the response of the sensor 24 to an increase and a decrease of the temperature associated with the brightness of the projected image that is switched according to the projection modes or the like needs a certain amount of time.

In contrast, the prism temperature sensor 25 is installed at a position adjacent to the prism element 27, and the prism element 27 introduces the image light from the liquid crystal panels 28 to the projection lens 19.

Therefore, the use of the prism temperature sensor 25 makes it possible to detect the change of temperature which occurs in association with the switching of the projected image in a short time.

Accordingly, a more accurate correction of the temperature defocusing can be performed as compared with a case where the temperature of the projection lens 19 is detected by using only the projection lens temperature sensor 24.

Figure 2:
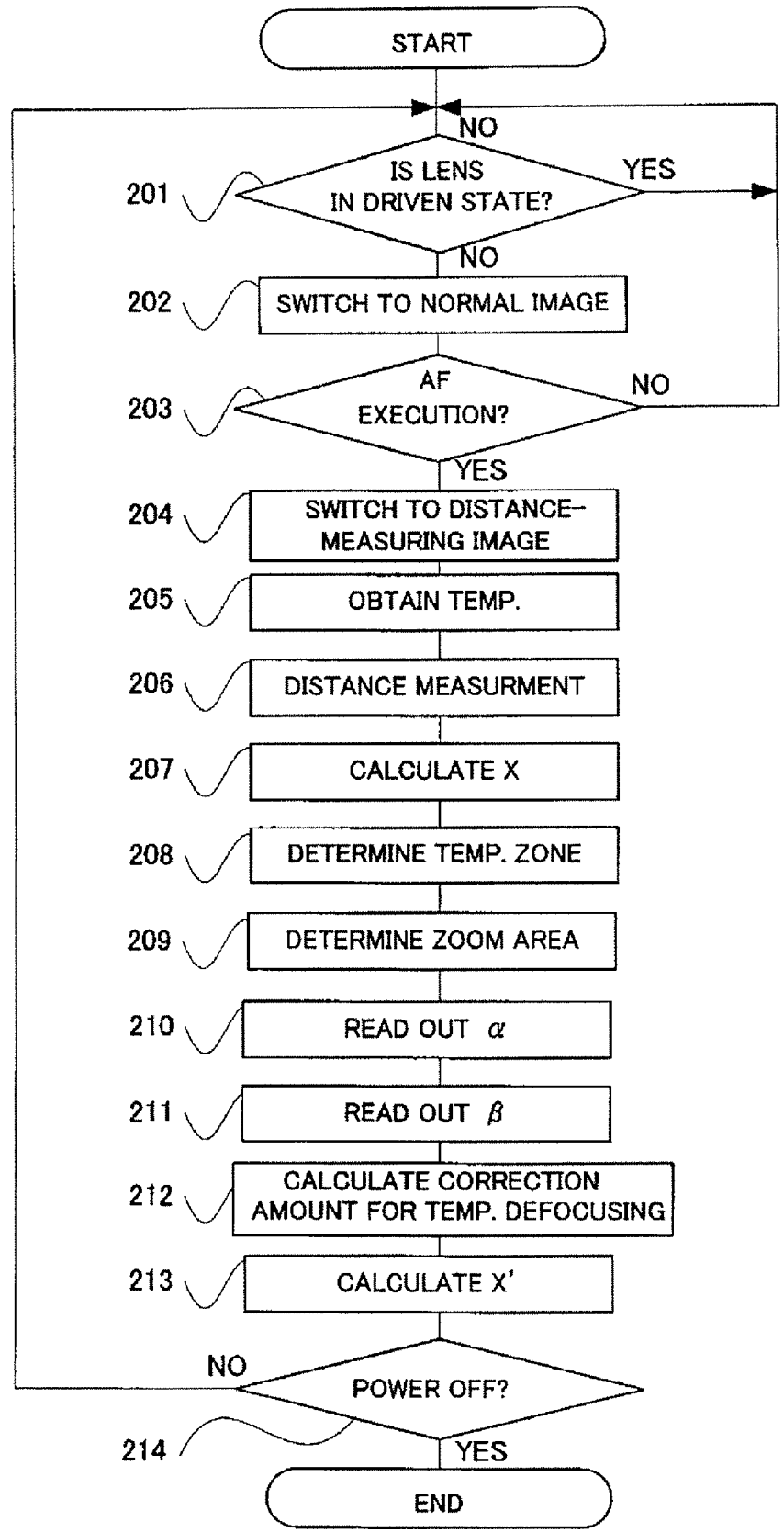
FIG. 2 is a flowchart showing processes of a temperature defocusing correction in the embodiment.

FIG. 2 shows processes of the AF control executed in the projector of the present embodiment. The controller 10 executes the processes according to a computer program stored in the memory 12.

First, at step 201, the controller 10 determines whether or not at least one of the variator lens 20 and the focus lens 21 is in a driven state. If yes, the controller 10 repeats step 201 until the lens drive is finished. If no, the controller 10 proceeds to step 202.

At step 202, the controller 10, if the distance-measuring image is projected, switches it to a normal image. However, if the normal image has already been projected, the controller 10 directly proceeds to step 203.

At step 203, the controller 10 waits for an AF execution command from a remote controller or the operation part 11. If the AF execution command is not input, the controller 10 proceeds to step 201. On the other hand, if the AF execution command is input, the controller 10 proceeds to step 204 to projects the distance-measuring image.

At step 205, the controller 10 takes in the output value T1 of the ambient temperature sensor 23, the output value T2 of the projection lens temperature sensor 24, and the output value T3 of the prism temperature sensor 25.

Next, at step 206, the controller 10 takes in the distance measurement information from the AF sensor 22 and, at step 207, calculates the focus position X on the basis of the distance measurement information. Then, at steps 208 to step 213, the controller 10 performs the correction of the temperature defocusing for the focus position X using the output from each temperature sensor.

At step 208, the controller 10 determines the temperature zone m from the output value T1 of the ambient temperature sensor 23. In this embodiment, the temperature zones are set as follows: a first zone (m=1) for temperatures lower than a first predetermined temperature T11; a second zone (m=2) for temperatures equal to or higher than the first predetermined temperature T11 and lower than a second predetermined temperature T12 (>T11); and a third temperature zone (m=3) for temperatures equal to or higher than the second predetermined temperature T12.

The reason for providing these plural temperature zones is that the amount of the temperature defocusing occurring in the projection lens 19 is changed due to not only the temperature of the projection lens 19 but also the environmental temperature.

Next, at step 209, the controller 10 detects the current variator lens position through a zoom position sensor, not shown, and determines the current zoom area n. In this embodiment, five zoom areas (first to fifth areas: n=1~5) are set in a zoom range from the wide-angle end to the telephoto end.

The reason for providing these plural zoom areas is that the amount of the temperature defocusing occurring in the projection lens 19 is changed due to not only the temperature of the projection lens 19 but also the focal length thereof.

Next, at steps 210 and 211, the controller 10 determines a temperature coefficient α and a temperature coefficient β. The temperature coefficient α is used for correcting the temperature defocusing caused due to the change of temperature of the projection lens 19, and the temperature coefficient β is used for correcting the temperature defocusing caused due to the switching of the projected image.

The temperature coefficients α and β are determined from Temperature Coefficient Table 1 for the output value T2 of the projection lens temperature sensor 24 and Temperature Coefficient Table 2 for the output value T3 of the prism temperature sensor 25, respectively. These temperature coefficient tables are stored in the memory 12.

For example, if the temperature zone for the output value T1 of the ambient temperature sensor 23 is the second zone (T11≦T1<T12) and the zoom area is the third area, that is, m=2 and n=3, the temperature coefficients α and β are α23 and β23.

Next, at step 212, the controller 10 reads out from the memory 12 the temperature T2ADJ which is the temperature detected by the projection lens temperature sensor 24 at the time of assembly and adjustment of the projector in the factory (hereinafter referred to merely as "at the adjustment time") and the temperature T3ADJ which is the temperature detected by the prism temperature sensor 25 at the adjustment time.

These sensor output values at the adjustment time are data that were stored in the memory 12 at that time.

Furthermore, the controller 10 calculates the correction amount for the temperature defocusing ΔX from the temperatures T2ADJ and T3ADJ at the adjustment time, the sensor output values T2 and T3 obtained at step 205, and the temperature coefficients α and β determined at step 210 using the following expression.

$$\Delta X = (T2 - T2ADJ) \times \alpha + (T3 - T3ADJ) \times \beta$$

Next, at step 213, the controller 10 re-calculates the focus position to obtain the corrected focus position X' using the following expression.

$$X' = X + \Delta X$$

Then, the controller 10 drives the focus lens 21 through the driver 18 to the corrected focus position X' calculated at step 213.

Further, at step 214, the controller 10 determines whether or not an off-operation of the power on/off switch is performed. If yes, the controller 10 ends the AF control processing, and if no, the controller 10 returns to step 201.

As described above, according to the present embodiment, it is possible to correct the temperature defocusing changing in association with the environmental temperature on the basis of the output values from the ambient temperature sensor 23 and the projection lens temperature sensor 24, and correct the temperature defocusing associated with the projected images on the basis of the output value from the prism temperature sensor 25. Accordingly, a better (more accurate) correction of the temperature defocusing can be performed as compared with a case where the correction thereof is performed on the basis of only the output value from the projection lens temperature sensor 24.

In other words, according to the present embodiment, it is possible to perform the focus control (that is, the correction of the temperature defocusing) using the all detection results by plural temperature sensors that detect the temperatures at portions or regions different from each other in the image projection apparatus. Therefore, the temperature defocusing caused due to various factors such as the change of the environmental temperature and the switching of the projected image can be corrected well.

Furthermore, according to the present embodiment, it is possible to well correct the temperature defocusing changing in association with the zoom areas (focal lengths) of the projection lens 19.

Although the preferred embodiment of the present invention were described above, embodiments thereof are not limited to these preferred embodiments, and various variations and modifications may be made without departing from the scope of the present invention.

For example, in the above-described embodiment, the temperature coefficients $\alpha$ and $\beta$ are read out from the pre-stored temperature coefficient tables. In contrast, the temperature coefficients $\alpha$ and $\beta$ may be calculated in each case.

Furthermore, in the above-described embodiment, the temperature coefficients $\alpha$ and $\beta$ are read out from the temperature coefficient tables, and then the correction amount of the temperature defocusing is calculated by substituting $\alpha$ and $\beta$ to a calculation expression. In contrast, the correction amounts of the temperature defocusing may be prepared as table data and then a value corresponding to the temperature detection results may be read out therefrom.

Moreover, the installation positions of the three temperature sensors in the above-described embodiment are examples, and the three temperature sensors may be installed at positions different therefrom. The number of temperature sensors that are used is not limited to three, that is, it may be two, or four or more.

Furthermore, the above-described embodiment described a case where the AF control including the correction of the temperature defocusing was performed. In contrast, the focus control for correcting the temperature defocusing and the AF control may be separately performed. In other words, the focus lens driven by the AF control may be moved to correct the temperature defocusing.

This application claims foreign priority benefits based on Japanese Patent Application No. 2006-124278, filed on Apr. 27, 2006, which is hereby incorporated by reference herein in its entirety as if fully set forth herein.

What is claimed is:

1. An image projection apparatus comprising:
   an image-forming element configured to be illuminated with light from a light source;
   a projection lens configured to include a focus lens and configured to project light from the image-forming element onto a projection surface;
   plural temperature detectors configured to be provided at positions different from each other in the image projection apparatus and configured to detect temperatures at the respective positions as detection results;
   a controller configured to control the position of the focus lens on the basis of the detection results by the plural temperature detectors; and
   an optical member configured to introduce the light from the image-forming element to the projection lens,
   wherein a first temperature detector of the plural temperature detectors is configured to detect the temperature of the optical member or in a region adjacent thereto, and
   wherein the region adjacent to the optical member is closer to the optical member than the projection lens.

2. The apparatus according to claim 1, wherein the controller is configured to determine a temperature zone on the basis of the detection result by a second temperature detector of the plural temperature detectors and is configured to obtain information for controlling the position of the focus lens on the basis of the temperature zone and the detection result by at least one other temperature detector including the first temperature detector.

3. The apparatus according to claim 2, wherein the second temperature detector is configured to detect an environmental temperature around the apparatus.

4. The apparatus according to claim 3, further comprising an AF detector configured to detect AF information used in autofocus control of the projection lens,
   wherein the second temperature detector being installed near the AF detector is used also as a temperature detector for correcting the AF information detected by the AF detector in association with temperature.

5. The apparatus according to claim 1,
   wherein the apparatus includes plural image-forming elements, and
   wherein the optical member is configured to combine light components from the plural image-forming elements and is configured to introduce the combined light to the projection lens.

6. The apparatus according to claim 1, wherein the plural temperature detectors include a temperature detector configured to detect the temperature of the projection lens or in a region adjacent thereto.

7. The apparatus according to claim 1,
   wherein the projection lens is a zoom lens capable of varying its focal length, and
   wherein the controller is configured to obtain information associated with the focal length of the projection lens as information for controlling the position of the focus lens.

8. An image display system comprising:
   the image projection apparatus according to claim 1; and
   an image supply apparatus configured to supply image information to the image projection apparatus.

* * * * *